(12) United States Patent
Park (10) Patent No.: US 11,084,480 B2
(45) Date of Patent: Aug. 10, 2021

(54) ELECTRIC BRAKE SYSTEM AND CONTROLLING METHOD THEREOF

(71) Applicant: MANDO CORPORATION, Gyeonggi-do (KR)

(72) Inventor: Yulshin Park, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 35 days.

(21) Appl. No.: 16/296,077

(22) Filed: Mar. 7, 2019

(65) Prior Publication Data

US 2019/0275997 A1    Sep. 12, 2019

(30) Foreign Application Priority Data

Mar. 8, 2018    (KR) .................. 10-2018-0027362

(51) Int. Cl.
*B60T 17/22* (2006.01)
*B60T 13/20* (2006.01)
(Continued)

(52) U.S. Cl.
CPC ............ *B60T 17/221* (2013.01); *B60T 7/042* (2013.01); *B60T 8/3255* (2013.01);
(Continued)

(58) Field of Classification Search
CPC ........ B60T 17/221; B60T 13/20; B60T 13/18; B60T 13/686; B60T 2270/402
See application file for complete search history.

(56) References Cited

U.S. PATENT DOCUMENTS 9,365,199 B2 *    6/2016    Drumm ................ B60T 8/4063
2016/0200307 A1 *    7/2016    Feigel ...................... B60T 7/12
303/6.01
(Continued)

FOREIGN PATENT DOCUMENTS

DE    102015219905 A1 *    4/2017    ............ B60T 17/221
JP    9-104341    4/1997
(Continued)

OTHER PUBLICATIONS

Office Action dated Apr. 11, 2019 for Korean Application No. 10-2018-0027362 and its English machine translation by Google Translate.
(Continued)

*Primary Examiner* — Xuan Lan Nguyen
(74) *Attorney, Agent, or Firm* — Ladas & Parry, LLP (57) ABSTRACT

An embodiment provides an electric brake system including a hydraulic pressure supplier configured to produce hydraulic pressure of oil using rotation force of a motor; a hydraulic circuit configured to convey hydraulic pressure discharged from the hydraulic pressure supplier to a wheel cylinder; a motor position sensor configured to measure a position of the motor; a motor current sensor configured to measure a current of the motor; and a controller configured to determine whether there is a leak in the hydraulic circuit based on the measured position and current of the motor, and determine a circuit that has a leak based on the measured position and current of the motor when it is determined to have a leak in the hydraulic circuit.

20 Claims, 6 Drawing Sheets

(51) Int. Cl.
- *B60T 13/68* (2006.01)
- *B60T 13/18* (2006.01)
- *B60T 13/66* (2006.01)
- *B60T 13/14* (2006.01)
- *B60T 8/40* (2006.01)
- *B60T 13/74* (2006.01)
- *B60T 8/32* (2006.01)
- *B60T 7/04* (2006.01)
- *B60T 8/88* (2006.01)

(52) U.S. Cl.
CPC .......... *B60T 8/4081* (2013.01); *B60T 13/146* (2013.01); *B60T 13/18* (2013.01); *B60T 13/20* (2013.01); *B60T 13/662* (2013.01); *B60T 13/686* (2013.01); *B60T 13/745* (2013.01); *B60T 8/404* (2013.01); *B60T 8/88* (2013.01); *B60T 2270/402* (2013.01)

(56) References Cited

U.S. PATENT DOCUMENTS

| | | | |
|---|---|---|---|
| 2017/0072928 A1* | 3/2017 | Kim | B60T 11/22 |
| 2017/0210372 A1* | 7/2017 | Feigel | B60T 17/227 |
| 2018/0297574 A1* | 10/2018 | Zimmermann | B60T 13/167 |

FOREIGN PATENT DOCUMENTS

| | | |
|---|---|---|
| KR | 10-1333862 | 11/2013 |
| KR | 10-2014-0036303 | 3/2014 |
| KR | 10-2017-0045523 | 4/2017 |
| KR | 10-2017-0046787 | 5/2017 |
| KR | 10-2017-0065827 | 6/2017 |

OTHER PUBLICATIONS

Office Action dated Nov. 26, 2018 for Korean Application No. 10-2018-0027362 and its English machine translation by Google Translate.

* cited by examiner

ELECTRIC BRAKE SYSTEM AND CONTROLLING METHOD THEREOF

CROSS-REFERENCE TO RELATED APPLICATION

This application is based on and claims priority under 35 U.S.C. § 119 to Korean Patent Application No. 10-2018-0027362 filed on Mar. 8, 2018, in the Korean Intellectual Property Office, the disclosure of which is incorporated herein by reference in its entirety.

BACKGROUND

1. Field of the Invention

The present disclosure relates to an electric brake system, and more particularly, to an electric brake system that generates braking force using an electric signal corresponding to a displacement of the brake pedal.

2. Discussion of Related Art

Brake systems are essentially equipped in vehicles, and various types of brake systems for attaining more robust and stable braking power have recently been proposed.

For example, the brake systems may include an Anti-lock brake system (ABS) for preventing wheel slippage during braking, a Brake Traction Control System (BTCS) for preventing slippage of driving wheels while the vehicle shoots ahead or races forward, an Electronic Stability Control System (ESC) for keeping the running state of the vehicle stable by controlling brake fluid pressure through a combination of the ABS and BTCS control, and the like.

In general, electric brake systems include hydraulic pressure suppliers, and when the driver steps on the brake pedal, the hydraulic pressure supplier receives the driver's intention of braking in an electric signal from a pedal displacement sensor which detects a displacement of the brake pedal and applies pressure to the wheel cylinder.

For the electric brake system, studies on how to determine an occasion when there is a leak have been continually conducted.

SUMMARY OF THE INVENTION

The disclosure provides an electric brake system and control method thereof, which provides leak control by controlling an inlet valve capable of controlling the amount of fluid of a hydraulic circuit.

In accordance with an aspect of the disclosure, an electric brake system includes a hydraulic pressure supplier configured to produce hydraulic pressure of oil using rotation force of a motor; a hydraulic circuit configured to convey hydraulic pressure discharged from the hydraulic pressure supplier to a wheel cylinder; a motor position sensor configured to measure a position of the motor; a motor current sensor configured to measure a current of the motor; and a controller configured to determine whether there is a leak in the hydraulic circuit based on the measured position and current of the motor, and determine a circuit that has a leak based on the measured position and current of the motor when it is determined to have a leak in the hydraulic circuit.

The controller may determine a stiffness coefficient of the system based on a position and current of the motor, and determine that there is a leak in the hydraulic circuit when the stiffness coefficient is equal to or less than a first threshold.

The hydraulic circuit may include a first hydraulic circuit configured to convey hydraulic pressure discharged from the hydraulic pressure supplier to a wheel cylinder installed on at least one wheel; and a second hydraulic circuit configured to convey hydraulic pressure discharged from the hydraulic pressure supplier to a wheel cylinder installed on at least one wheel, wherein the first hydraulic circuit comprises at least one or more inlet valves configured to control the flow of hydraulic pressure discharged from the hydraulic pressure supplier, and wherein the second hydraulic circuit comprises at least one or more inlet valves configured to control the flow of hydraulic pressure discharged from the hydraulic pressure supplier.

The controller may close an inlet valve of the first hydraulic circuit, when the stiffness coefficient is equal to or less than the first threshold.

The controller may determine whether the stiffness coefficient is equal to or less than a second threshold after closing the inlet valve of the first hydraulic circuit, and based on the determination, determine the first hydraulic circuit or the second hydraulic circuit to have a leak.

The controller may determine the first hydraulic circuit to have a leak, when the stiffness coefficient is greater than the second threshold.

The controller may determine the second hydraulic circuit to have a leak when the stiffness coefficient is equal to or less than the second threshold, and close the inlet valve of the second hydraulic circuit.

The controller may close a first inlet valve included in the circuit determined to have a leak, and determine a wheel that has a leak based on whether the stiffness coefficient exceeds a third threshold.

The controller may determine a wheel coupled to a second inlet valve included in the circuit having a leak to have a leak when the stiffness coefficient exceeds the third threshold, and close the second inlet valve.

The controller may determine a wheel coupled to the first inlet valve to have a leak when the stiffness coefficient is equal to or less than the third threshold.

In accordance with another aspect of the disclosure, a control method of an electric brake system includes measuring a position of a motor of a hydraulic pressure supplier; measuring a current of the motor; determining whether there is a leak in a hydraulic circuit configured to covey hydraulic pressure discharged from the hydraulic pressure supplier to a wheel cylinder based on the measured position and current of the motor; and determine a circuit that has a leak based on the measured position and current of the motor when it is determined to have a leak in the hydraulic circuit.

Determining whether there is a leak may include determining a stiffness coefficient of the system based on a position and current of the motor, and determining that there is a leak when the stiffness coefficient is equal to or less than a first threshold.

The control method may further include closing an inlet valve of a first hydraulic circuit, when the stiffness coefficient is equal to or less than the first threshold.

Determining a circuit that has a leak may include determining whether the stiffness coefficient is equal to or less than a second threshold after closing the inlet valve of the first hydraulic circuit, and based on the determination, determining one of the first hydraulic circuit and a second hydraulic circuit to have a leak.

Determining one of the first hydraulic circuit and a second hydraulic circuit to have a leak may include determining the first hydraulic circuit to have a leak, when the stiffness coefficient is greater than the second threshold.

Determining one of the first hydraulic circuit and a second hydraulic circuit to have a leak may include closing the inlet valve of the second hydraulic circuit when the stiffness coefficient is equal to or less than the second threshold, and determining the second hydraulic circuit to have a leak.

The control method may further include closing a first inlet valve included in the circuit determined to have a leak, and determining a wheel that has a leak based on whether the stiffness coefficient exceeds a third threshold.

Determining a wheel that has a leak may include closing a second inlet valve included in the circuit determined to have a leak when the stiffness coefficient exceeds the third threshold, and determining a wheel coupled to the second inlet valve to have a leak, and determining a wheel coupled to the first inlet valve to have a leak when the stiffness coefficient is equal to or less than the third threshold.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

Figure 1:
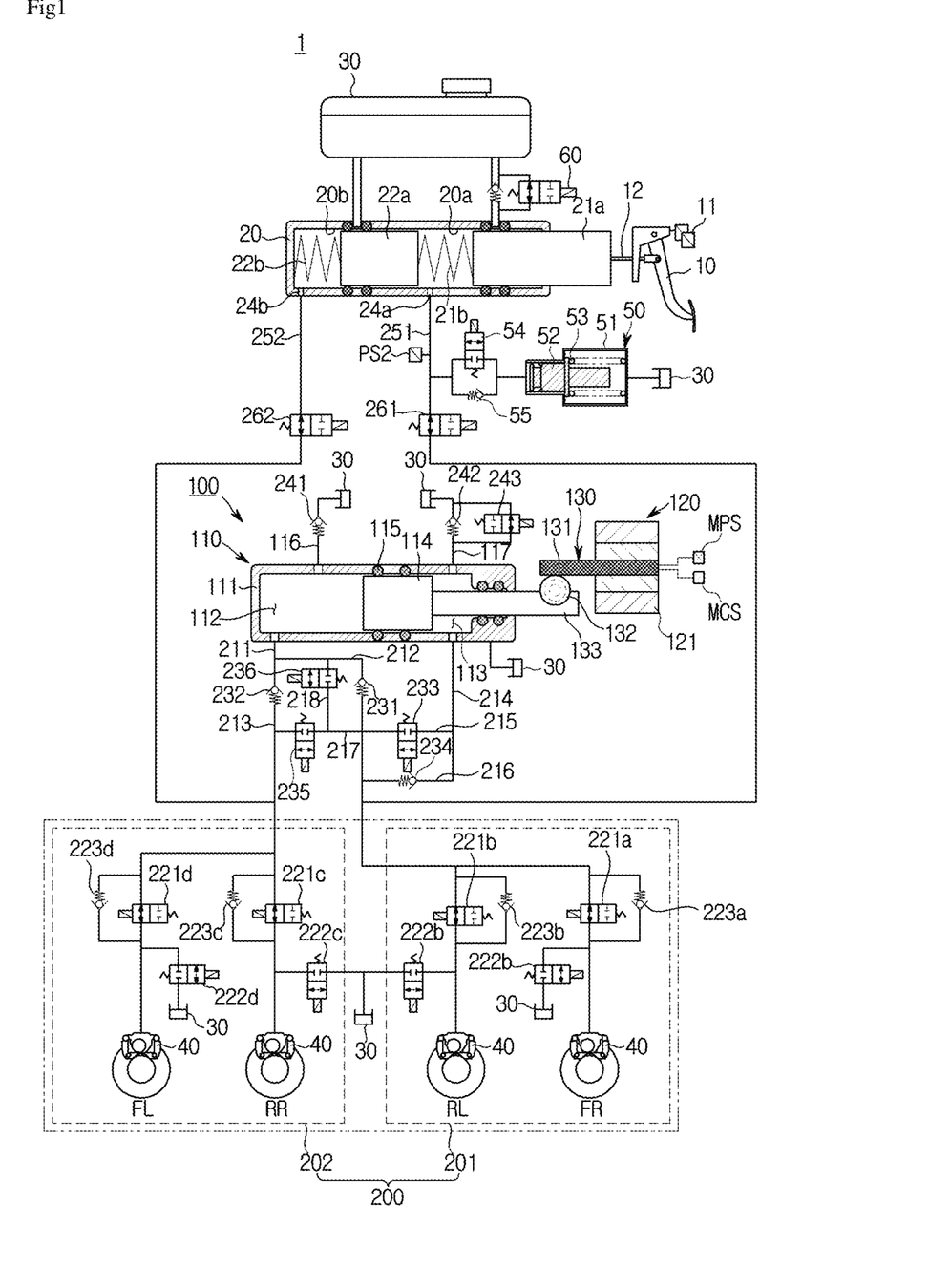
FIG. 1 is a hydraulic circuit diagram illustrating a state when an electric brake system is not braked, according to an embodiment.

FIG. 1 is a hydraulic circuit diagram illustrating a state when an electric brake system is not braked, according to an embodiment.

Referring to FIG. 1, an electric brake system 1 typically includes a master cylinder 20 for producing a hydraulic pressure, a reservoir 30 coupled to an upper portion of the master cylinder 20 for storing oil, an input load 12 for pressurizing the master cylinder 20 based on a pedal effort on a brake pedal 10, a wheel cylinder 40 for receiving the hydraulic pressure to perform braking of each wheel RR, RL, FR, or FL, a pedal displacement sensor 11 for detecting a displacement of the brake pedal 10, and a simulation device 50 for applying reaction force in response to a pedal effort on the brake pedal 10.

The master cylinder 20 may include at least one chamber and produce a hydraulic pressure. For example, the master cylinder 20 may include a first master chamber 20a and a second master chamber 20b.

Referring to FIG. 1, the simulation device 50 may include a simulation chamber 51 provided to store oil discharged from a first hydraulic port 24a of the master cylinder 20, a reaction piston 52 provided in the simulation chamber 51, a pedal simulator equipped with a reaction spring 53 elastically supporting the reaction piston 52, and a simulator valve 54 coupled to a rear end of the simulation chamber 51.

The reaction piston 52 and the reaction spring 53 are installed to have a certain range of displacement in the simulation chamber 51 due to the oil moved into the simulation chamber 51.

The reaction spring 53 shown in FIG. 1 is merely an embodiment of providing elastic force to the reaction piston 52, but may have other various embodiments that may store the elastic force with shape deformation. For example, the reaction spring 53 may be made of a material such as rubber, or may include various members having the figure of a coil or plate to store the elastic force.

The simulator valve 54 may be provided in a flow path that couples the rear end of the simulation chamber 51 to the reservoir 30. The simulation chamber 51 may have the front end coupled to the master cylinder 20 and the rear end coupled to the reservoir 30 through the simulator valve 54. Accordingly, the inside of the simulation chamber 51 may be fully filled with the oil moved from the reservoir 30 through the simulator valve 54 even when the reaction piston 52 returns.

In the drawings, a plurality of reservoirs 30 are shown with the same reference numeral. The reservoirs 30 may be provided with the same or different parts. For example, the reservoir 30 coupled to the simulation device 50 may be the same as the reservoir 30 coupled to the master cylinder 20, or may be a reservoir capable of storing oil separately from the reservoir 30 coupled to the master cylinder 20.

The simulator valve 54 may include a normal-closed type of solenoid valve that remains closed at ordinary times. The simulator valve 54 may be opened when the driver applies a pedal effort on the brake pedal 10 and may convey the oil in the simulation chamber 51 to the reservoir 30.

Furthermore, there may be a simulator check valve 55 installed between a pedal simulator and the reservoir 30 to be coupled in parallel with the simulator valve 54. The simulator check valve 55 may allow the oil of the reservoir 30 to flow to the simulation chamber 51 while blocking the oil of the simulation chamber 51 from flowing to the reservoir 30 through a flow path with the check valve 55 installed therein. When the pedal effort is released from the brake pedal 10, the oil may be supplied into the simulation chamber 51 through the simulator check valve, which may guarantee quick return of the pedal simulator pressure.

As for how the pedal simulation device 50 operates, when the driver applies a pedal effort on the brake pedal 10, the oil in the simulation chamber 51, which is pushed out by the reaction spring 53 being compressed by the reaction piston 52 of the pedal simulator, is conveyed to the reservoir 30 through the simulator valve 54, and in this process, the driver gets a pedal feeling. When the driver releases the pedal effort from the brake pedal 10, the reaction spring 53 pushes the reaction piston 52 until the reaction piston 52 returns to its original state, and the oil from the reservoir 30 is moved into the simulation chamber 51 through the flow path with the simulator valve 54 installed therein and the flow path with the check valve 55 installed therein, making the simulation chamber 51 full with the oil.

As such, since the simulation chamber 51 is always filled with the oil, friction of the reaction piston 52 may be minimized while the simulation device 50 is working, thereby enhancing durability of the simulation device 50 as well as blocking inflow of foreign substances from the outside.

In an embodiment, the electric brake system 1 may include a hydraulic pressure supplier 100 configured to operate mechanically by receiving a braking intention of the driver in an electric signal from the pedal displacement sensor 11 that detects a displacement of the brake pedal 10, a hydraulic controller 200 including first and second hydraulic circuits 201 and 202 for each controlling the flow of hydraulic pressure conveyed to the wheel cylinders 40 installed at two car wheels RR, RL, FR, and FL, a first cut valve 261 provided in a first backup flow path 251 that couples the first hydraulic port 24a to the first hydraulic circuit 201 to control the flow of hydraulic pressure, a second cut valve 262 provided in a second backup flow path 252 that couples the second hydraulic port 24b to the second hydraulic circuit 202 to control the flow of hydraulic pressure, and an electronic control unit (ECU) (not shown) configured to control the hydraulic pressure supplier 100 and valves 54, 60, 221a, 221b, 221d, 222a, 222b, 222c, 222d, 233, 235, 236, 243 based on information about hydraulic pressure and pedal displacement.

The hydraulic pressure supplier 100 may include a hydraulic pressure supplying unit 110 for applying oil pressure conveyed to the wheel cylinder 40, a motor 120 for generating rotational force based on an electric signal from the pedal displacement sensor 11, and a power converter 130 for converting rotation of the motor 120 to linear motion and transferring the linear motion to the hydraulic pressure supplying unit 110. The hydraulic pressure supplying unit 110 may be operated by pressure applied from a high pressure accumulator instead of the driving force supplied from the motor 120.

Next, flow paths 211, 212, 213, 214, 215, 216, and 217 and valves 231, 232, 233, 234, 235, 236, 241, 242, 243 coupled to the first and second pressure chambers 112 and 113 will be described.

The second hydraulic flow path 212 may be linked to the first hydraulic circuit 201, and the third hydraulic flow path 213 may be linked to the second hydraulic circuit 202. Accordingly, the forward movement of a hydraulic piston 114 may enable the hydraulic pressure to be conveyed to the first and second hydraulic circuits 201 and 202.

Furthermore, the electric brake system 1 according to an embodiment may include the first and second control valves 231 and 232 provided in the second and third hydraulic flow paths 212 and 213, respectively, to control the flow of oil.

The first and second control valves 231 and 232 may be provided as check valves that allow an oil flow from the first pressure chamber 112 to the first or second hydraulic circuit 201 or 202 while blocking an oil flow in the reverse direction. Specifically, the first or second control valve 231 or 232 may allow the hydraulic pressure of the first pressure chamber 112 to be conveyed to the first or second hydraulic circuit 201 or 202 and block the hydraulic pressure of the first or second hydraulic circuit 201 or 202 from leaking out into the first pressure chamber 112 through the second or third hydraulic flow path 212 or 213.

The fourth hydraulic flow path 213 may be branched into the fifth and sixth hydraulic flow paths 215 and 216 to be linked both to the first and second hydraulic circuits 201 and 202. For example, the fifth hydraulic flow path 215 branched from the fourth hydraulic flow path 214 may be linked to the first hydraulic circuit 201, and the sixth hydraulic flow path 216 branched from the fourth hydraulic flow path 214 may be linked to the second hydraulic circuit 202. Accordingly, the backward movement of the hydraulic piston 114 may enable the hydraulic pressure to be conveyed to both the first and second hydraulic circuits 201 and 202.

Furthermore, the electric brake system 1 according to an embodiment may include the third and fourth control valves 233 and 234 provided in the fifth and sixth hydraulic flow paths 215 and 216, respectively, to control the flow of oil.

The third control valve 233 may be provided as a bidirectional control valve to control oil flows between the second pressure chamber 113 and the first hydraulic circuit 201. Furthermore, the third control valve 233 may be provided as a normal-closed type of solenoid valve that remains closed at ordinary times but is opened when receiving an open signal from the ECU.

The fourth control valve 234 may be provided as a check valve that allows an oil flow from the second pressure chamber 113 to the second hydraulic circuit 202 while blocking an oil flow in the reverse direction. In other words, the fourth valve 234 may prevent the hydraulic pressure of the second hydraulic circuit 202 from leaking out into the second pressure chamber 113 through the sixth and fourth hydraulic flow paths 216 and 214.

Moreover, the electric brake system 1 according to an embodiment may include a fifth control valve 235 provided in the seventh hydraulic flow path 217 that couples the second hydraulic flow path 212 to the third hydraulic flow path 213 to control oil flows, and a sixth control valve 236 provided in the eighth hydraulic flow path 218 that couples the second hydraulic flow path 212 to the seventh hydraulic flow path 217 to control oil flows. The fifth and sixth control valves 235 and 236 may be provided as a normal-closed type of solenoid valve that remains closed at ordinary times but is opened when receiving an open signal from the ECU.

The firth and sixth control valves 235 and 236 may be opened when there is an error in the first or second control valve 231 or 232, enabling the hydraulic pressure of the first pressure chamber 112 to be conveyed both to the first and second hydraulic circuits 201 and 202.

Moreover, the fifth and sixth control valves 235 and 236 may be opened when the hydraulic pressure is released from the wheel cylinder 40 into the first pressure chamber 112. This is because the first and second control valves 231 and 232 arranged in the second and third hydraulic flow paths 212 and 213 are provided as check valves that allow an unidirectional oil flow.

Furthermore, the electric brake system 1 according to an embodiment may further include first and second dump valves 241 and 242 provided in the first and second dump flow paths 116 and 117, respectively, to control oil flows. The dump valves 241 and 242 may be check valves that are opened to a direction from the reservoir 30 to the first or second pressure chamber 112 or 113 while being closed for the reverse direction. Specifically, the first dump valve 241 may be a check valve that allows the oil to flow from the reservoir 30 to the first pressure chamber 112 while blocking the oil from flowing into the reservoir 30 from the first pressure chamber 112, and the second dump valve 242 may be a check valve that allows the oil to flow from the reservoir 30 to the second pressure chamber 113 while blocking the oil from flowing into the reservoir 30 from the second pressure chamber 112.

Furthermore, the second dump flow path 117 may include a bypass flow path, and there may be a third dump valve 243 installed in the bypass flow path to control oil flows between the second pressure chamber 113 and the reservoir 30.

The third dump valve 243 may be provided as a solenoid valve that may control bidirectional flows, which may be a normal-open type of solenoid valve that remains opened at ordinary times but is closed when receiving a close signal from the ECU.

The hydraulic pressure supplying unit 110 of the electronic braking system 1 according to an embodiment may operate in a double-acting mechanism. Specifically, a hydraulic pressure produced in the first pressure chamber 112 from the forward movement of the hydraulic piston 114 may be conveyed to the first hydraulic circuit 201 through the first and second hydraulic flow paths 211 and 212 to operate the wheel cylinders 40 installed on the front right wheel (FR) and the rear left (LR) wheel, and to the second hydraulic circuit 202 through the first and third hydraulic flow paths 211 and 213 to operate the wheel cylinders 40 installed on the rear right wheel (RR) and the front left wheel (FL).

Likewise, a hydraulic pressure produced in the second pressure chamber 113 from the backward movement of the hydraulic piston 114 may be conveyed to the first hydraulic circuit 201 through the fourth and fifth hydraulic flow paths 214 and 215 to operate the wheel cylinders 40 installed on the front right wheel (FR) and the rear left (RL) wheel, and to the second hydraulic circuit 202 through the fourth and sixth hydraulic flow paths 214 and 216 to operate the wheel cylinders 40 installed on the rear right wheel (RR) and the front left wheel (FL).

Furthermore, a negative pressure produced in the first pressure chamber 112 from the backward movement of the hydraulic piston 114 may suck in the oil of the wheel cylinders 40 installed on the front right wheel (FR) and the rear left wheel RL and convey the oil to the first pressure chamber 112 through the first hydraulic circuit 201, the second and first hydraulic flow paths 212 and 211, and may suck in the oil of the wheel cylinders 40 installed on the rear right wheel (RR) and the front left wheel (FL) and convey the oil to the first pressure chamber 112 through the second hydraulic circuit 202, the third and first hydraulic flow paths 213 and 211.

The motor 120 and power converter 130 of the hydraulic pressure supplier 100 will now be described.

The motor 120 is a device that may generate rotational force forward or backward based on a signal output from the ECU. The rotational angular speed and the rotation angle of the motor 120 may be controlled precisely. The motor 120 is well-known to the public, so the detailed description thereof will be omitted herein.

The ECU controls the motor 120 and the valves 54, 60, 221$a$, 221$b$, 221$c$, 221$d$, 222$a$, 222$b$, 222$c$, 222$d$, 233, 235, 236, and 243 in the electric brake system 1, as will be described below. How to control the plurality of valves based on displacement of the brake pedal 10 will be described later.

Driving force of the motor 120 may produce a displacement of the hydraulic piston 114 through the power converter 130, and a hydraulic pressure produced when the hydraulic piston 114 slides in the pressure chamber is conveyed to the wheel cylinder 40 installed on each of the wheels RR, RL, FR, and FL through the first and second hydraulic flow paths 211 and 212.

The power converter 130 is a device for converting rotational force into linear motion, and may include, for example, a worm shaft 131, a worm wheel 132, and a driving shaft 133.

The worm shaft 131 may be integrally formed with the rotation shaft of the motor 120, and may have the worm formed on the outer circumferential face to be coupled in gear with the worm wheel 132 to rotate the worm wheel 132. The worm wheel 132 may be coupled in gear with the driving shaft 133 to linearly move the driving shaft 133, and the driving shaft 133 is coupled to the hydraulic piston 114 to make the hydraulic piston 114 slide in a cylinder block 111.

In other words, a signal detected by the pedal displacement sensor 11 when a displacement is caused at the brake pedal 10 is sent to the ECU, and the ECU drives the motor 120 in one direction such that the worm shaft 131 is rotated in one direction. The rotational force of the worm shaft 131 is conveyed to the driving shaft 133 through the worm wheel 132, and the hydraulic piston 114 coupled to the driving shaft 133 moves forward, creating hydraulic pressure in the first pressure chamber 112.

On the contrary, when the pedal effort is released from the brake pedal 10, the ECU drives the motor 120 in the other direction such that the worm shaft 131 is rotated in the other direction. Accordingly, the worm wheel 132 is also rotated the other way and the hydraulic piston 114 coupled to the driving shaft 133 returns (i.e., moves backward), creating a negative pressure in the second pressure chamber 112.

It is also possible to produce the hydraulic pressure and the negative pressure in the opposite directions to the above. In other words, a signal detected by the pedal displacement sensor 11 when a displacement takes place at the brake pedal 10 is sent to the ECU, and the ECU drives the motor 120 in the opposite direction such that the worm shaft 131 is rotated in the opposite direction. The rotational force of the worm shaft 131 is conveyed to the driving shaft 133 through the worm wheel 132, and the hydraulic piston 114 coupled to the driving shaft 133 moves backward, producing hydraulic pressure in the second pressure chamber 113.

On the contrary, when the pedal effort is released from the brake pedal 10, the ECU drives the motor 120 in a direction such that the worm shaft 131 is rotated in the direction. Accordingly, the worm wheel 132 is also rotated the other way and the hydraulic piston 114 coupled to the driving shaft 133 returns (i.e., moves forward), producing negative pressure in the second pressure chamber 113.

As described above, the hydraulic pressure supplier 100 serves to convey hydraulic pressure to the wheel cylinder 40 based on the direction of rotational force generated from the motor 120 or to absorb and convey the hydraulic pressure to the reservoir 30.

When the motor 120 is rotated in one direction, hydraulic pressure may be produced in the first pressure chamber 112 or negative pressure may be produced in the second pressure chamber 113, in which case whether to apply the brakes using the hydraulic pressure or to release the brake using the negative pressure may be determined by controlling the valves 54, 60, 221a, 221b, 221c, 221d, 222a, 222b, 222c, 222d, 233, 235, 236, and 243. This will be described later in detail.

Although not shown, the power converter 130 may include a ball screw nut assembly. For example, the power converter 130 may include a screw integrally formed with the rotation shaft of the motor 120 or coupled to be rotated along with the rotation shaft of the motor 120 and a ball nut fastened with the screw in a state of limited rotation and moved linearly as the screw rotates. The hydraulic piston 114 is coupled to the ball nut of the power converter 130 to pressurize the pressure chamber by the linear movement of the ball nut. This structure of the ball screw nut assembly has a mechanism for converting rotational motion into linear motion, which is widely known to the public and thus the detailed description thereof will be omitted.

It will be understood that the power converter 130 according to an embodiment may have other structures than the ball screw nut assembly structure, which are capable of converting the rotational motion into linear motion.

In addition, the electronic brake system 1 according to an embodiment may include the first and second backup flow paths 251 and 252 that may supply oil discharged from the master cylinder 20 directly to the wheel cylinder 40 during an abnormal operation (e.g., in a fallback mode).

The first cut valve 261 may be arranged in the first backup flow path 251 to control the flow of oil, and the second cut valve 262 may be arranged in the second backup flow path 252 to control the flow of oil. Furthermore, the first backup flow path 251 may couple the first hydraulic port 24a to the second hydraulic circuit 201, and the second backup flow path 252 may couple the second hydraulic port 24b to the second hydraulic circuit 202.

The first and second cut valves 261 and 262 may be provided as a normal-open type of solenoid valves that remain opened at ordinary times but closed when receiving a close signal from the ECU.

The hydraulic controller 200 according to an embodiment will now be described in connection with FIG. 1.

The hydraulic controller 200 may include the first hydraulic circuit 201 and the second hydraulic circuit 202, each receiving hydraulic pressure to control two wheels. For example, the first hydraulic circuit 201 may control the front right wheel (FR) and the rear left wheel (RL), and the second hydraulic circuit 202 may control the front left wheel (FL) and the rear right wheel (RR). The wheel cylinder 40 is installed on each of the wheels (FR, FL, RR, and RL) to receive hydraulic pressure and apply the brakes.

The first hydraulic circuit 201 may be coupled to the first and second hydraulic flow paths 211 and 212 to receive hydraulic pressure from the hydraulic pressure supplier 100, and the second hydraulic flow path 212 may be branched into two flow paths coupled to the front right wheel FR and the rear left wheel RL. Similarly, the second hydraulic circuit 202 may be coupled to the first and third hydraulic flow paths 211 and 213 to receive hydraulic pressure from the hydraulic pressure supplier 100, and the third hydraulic flow path 213 may be branched into two flow paths coupled to the front left wheel FL and the rear right wheel RR.

The first and second hydraulic circuits 201 and 202 may include a plurality of inlet valves 221 (221a, 221b, 221c, and 221d) to control the flow of hydraulic pressure. For example, the first hydraulic circuit 201 may include two inlet valves 221a and 221b coupled to the first hydraulic flow path 211 to control hydraulic pressure conveyed to the two wheel cylinders 40, respectively. The second hydraulic circuit 202 may include two inlet valves 221c and 221d coupled to the second hydraulic flow path 212 to control hydraulic pressure conveyed to the wheel cylinders 40, respectively.

The inlet valve 221 is arranged in the upstream of the wheel cylinder 40 and provided as a normal-open type of solenoid valve that remains opened but closed when receiving a closed signal from the ECU.

The hydraulic circuits 201 and 202 may further include check valves 223a, 223b, 223c, and 223d provided in the bypass flow paths connecting front and rear ends of the respective inlet valves 221a, 221b, 221c, and 221d. The check valves 223a, 223b, 223c, and 223d may be provided to allow the flow of oil in a direction from the wheel cylinder 40 to the hydraulic pressure supplying unit 110 while limiting the flow of oil in a direction from the hydraulic pressure supplying unit 110 to the wheel cylinder 40. The check valves 223a, 223b, 223c, and 223d may quickly take out brake pressure of the wheel cylinders 40, and may enable hydraulic pressure of the wheel cylinder 40 to be moved to the hydraulic pressure supplying unit 110 when the inlet valves 221a, 221b, 221c, and 221d are not working properly.

The hydraulic circuits 201 and 202 may further include a plurality of outlet valves 222 (222a, 222b, 222c, and 222d) coupled to the reservoir 30 in order to enhance the brake-release performance. The outlet valve 222 is coupled to each wheel cylinder 40 to control the hydraulic pressure being taken out from each wheel RR, RL, FR, FL. Specifically, the outlet valve 222 may detect the brake pressure of each wheel RR, RL, FR, and FL and be selectively opened to control the pressure when it is necessary to reduce the brake pressure.

The outlet valve 222 may be provided as a normal-closed type of solenoid valve that remains closed at ordinary times but is opened when receiving an open signal from the ECU.

Furthermore, the hydraulic controller 200 may be coupled to the backup flow paths 251 and 252. For example, the first hydraulic circuit 201 may be coupled to the first backup flow path 251 to receive hydraulic pressure from the master cylinder 20, and the second hydraulic circuit 202 may be coupled to the second backup flow path 252 to receive hydraulic pressure from the master cylinder 20.

In this case, the first backup flow path 251 may join the first hydraulic circuit 201 in the upstream of the first and second inlet valves 221a and 221b. Similarly, the second backup flow path 252 may join the second hydraulic circuit 202 in the upstream of the third and fourth inlet valves 221c and 221d. Accordingly, in a case of closing the first and second cut valves 261 and 262, hydraulic pressure applied from the hydraulic pressure supplier 100 may be applied to the wheel cylinders 40 through the first and second hydraulic circuits 201 and 202, and in a case of opening the first and second cut valves 261 and 262, the hydraulic pressure applied from the master cylinder 20 may be applied to the wheel cylinders 40 through the first and second backup flow paths 251 and 252. At this time, since the plurality of inlet valves 221a, 221b, 221c, and 221d are in the open state, there is no need to switch the operation state.

Reference numeral 'PS11' refers to a first hydraulic flow path pressure sensor that detects hydraulic pressure of the first hydraulic circuit 201, reference numeral 'PS12' refers to a second hydraulic flow path pressure sensor that detects hydraulic pressure of the second hydraulic circuit 202, and reference numeral 'PS2' refers to a backup flow path pressure sensor that measures oil pressure of the master cylinder 20. 'MPS' refers to a motor control sensor that controls the rotation angle or current of the motor 120.

Operation of the electric brake system 1 according to an embodiment will now be described in detail.

The hydraulic pressure supplier 100 may be separately used in a low pressure mode pr in a high pressure mode. The low pressure mode and the high pressure mode may be changed by varying the operation of the hydraulic controller 200. The hydraulic pressure supplier 100 may use the high pressure mode to produce high hydraulic pressure without increasing output power of the motor 120. This may guarantee stable brake power while reducing costs and weight of the brake system.

For example, the hydraulic piston 114 produces hydraulic pressure in the first pressure chamber 112 by moving forward. As the hydraulic piston 114 moves forward from its initial state, i.e., as the stroke of the hydraulic piston 114 increases, the amount of oil conveyed from the first pressure chamber 112 to the wheel cylinder 40 increases and thus the hydraulic brake pressure increases. However, there is an effective stroke with the hydraulic piston 114, so there is a maximum pressure from the forward movement of the hydraulic piston 114.

The maximum pressure in the low pressure mode is less than the maximum pressure in the high pressure mode. However, compared to the low pressure mode, the high pressure mode has a small rate of increase in pressure per stroke of the hydraulic piston 114. This is because the oil pushed out from the first pressure chamber 112 is not all moved to the wheel cylinder 40 but part of the oil is moved into the second pressure chamber 113. This will be described in more detail with reference to FIG. 5.

Accordingly, in the early stage of braking, during which the brake response is considered important, the low pressure mode having a greater rate of increase in pressure per stroke may be used, and in the latter period of braking, during which the maximum braking force is considered important, the high pressure mode having a larger maximum pressure may be used.

Once the driver begins applying the brakes, the required amount of braking of the driver may be detected based on information such as a pressure on the brake pedal 10 that the driver applies through the pedal displacement sensor 11. The ECU receives an electronic signal output from the pedal displacement sensor 11 to drive the motor 120.

Furthermore, the ECU may receive the magnitude of regenerative braking through the backup flow path pressure sensor PS2 arranged on the exit side of the master cylinder 20 and the hydraulic flow path pressure sensor PS1 arranged in the second hydraulic circuit 202, calculate the magnitude of frictional braking based on a difference between the required amount of braking of the driver and the amount of regenerative braking, and determine an increase or decrease in pressure of the wheel cylinder 40.

Figure 2:
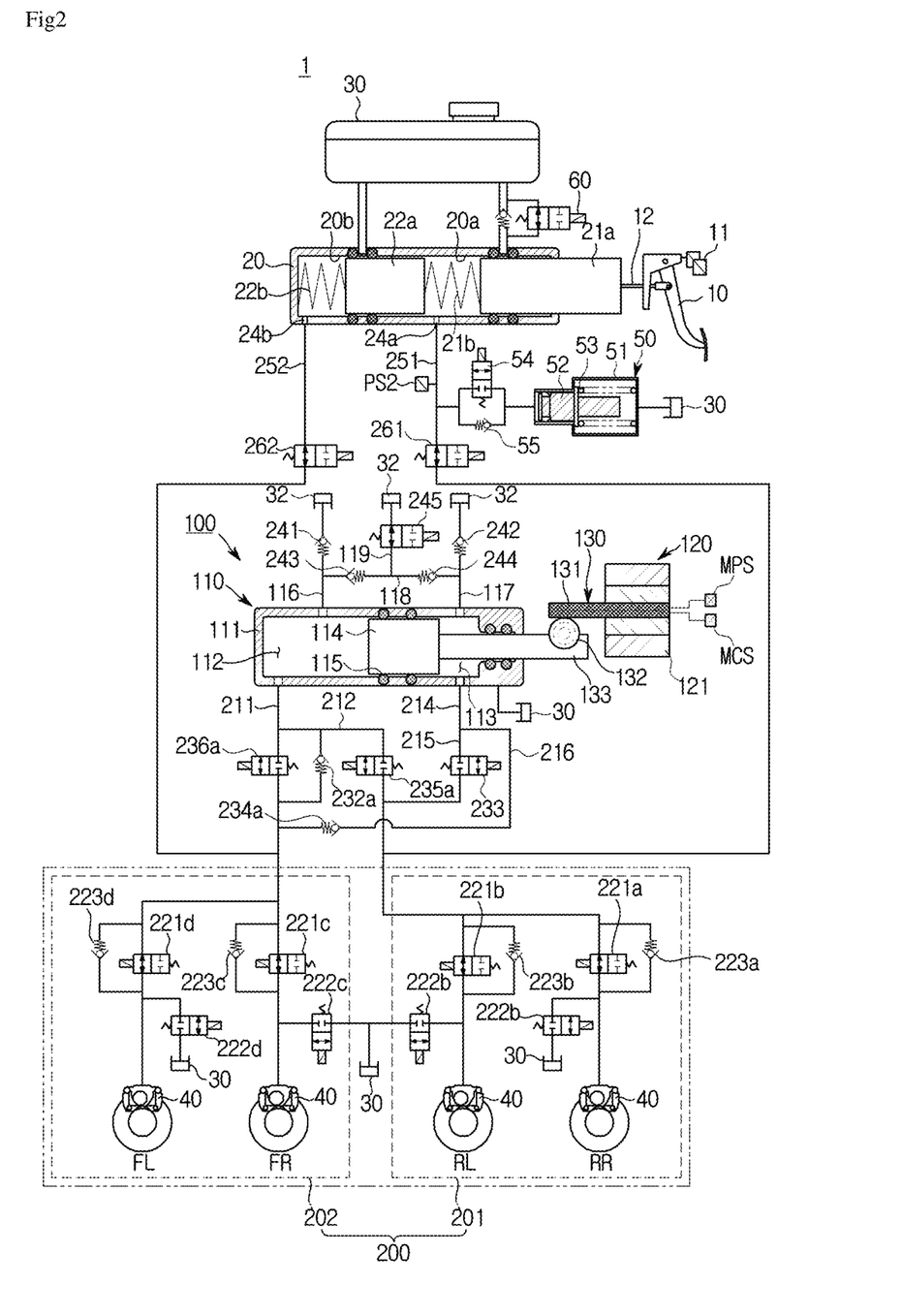
FIG. 2 is a hydraulic circuit diagram illustrating a state when an electric brake system is not braked, according to another embodiment.

FIG. 2 is a hydraulic circuit diagram illustrating a state when an electric brake system is not braked, according to an embodiment.

Referring to FIG. 2, the electric brake system 1 according to an embodiment may include an Integrated Dynamic Brake (IDB) rear wheel regenerative braking system.

In this case, the electric brake system 1 may include control valves 235a, 236a, and 232a coupled to the first and second hydraulic flow paths 211 and 212 and control valves 233 and 234a coupled to the fourth, fifth, and sixth hydraulic flow paths 214, 215, and 216.

Furthermore, the first hydraulic circuit 201 of the electric brake system 1 may control the rear left wheel (RL) and the rear right wheel (RR), and the second hydraulic circuit 202 may control the front left wheel (FL) and the front right wheel (FR).

Figure 3:
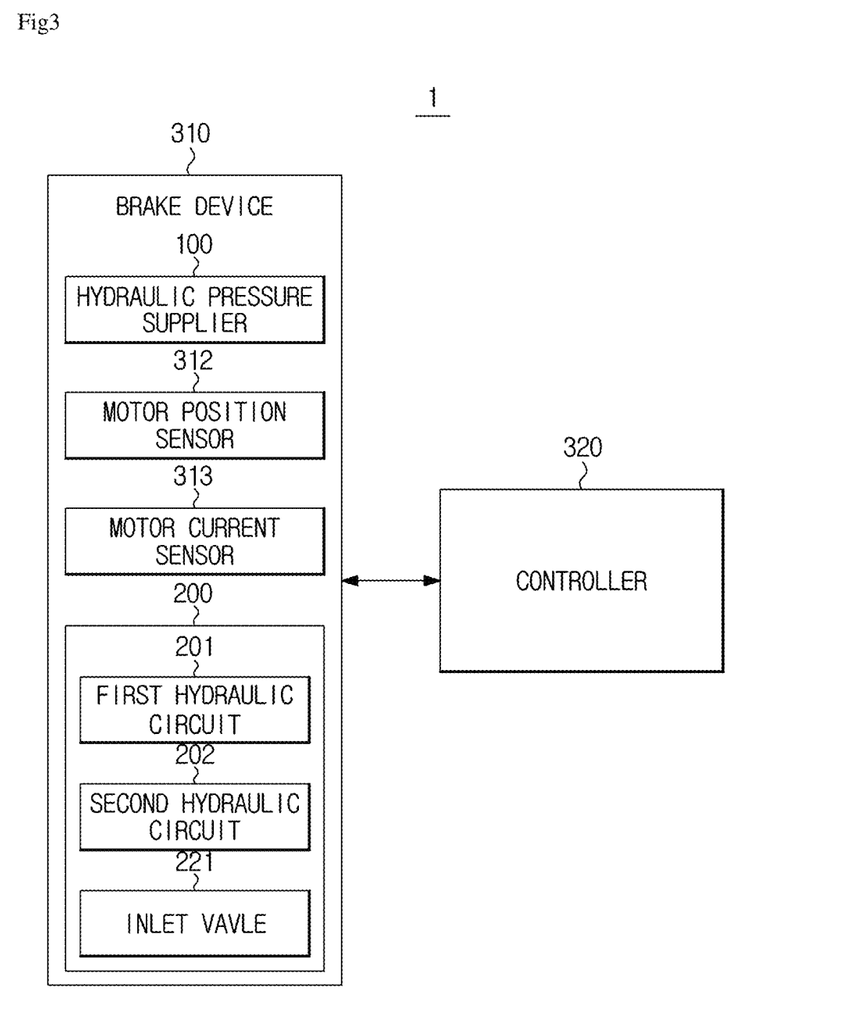
FIG. 3 is a control block diagram of an electric brake system, according to an embodiment.

FIG. 3 is a control block diagram of an electric brake system, according to an embodiment.

The electric brake system 1 may include a brake device 310 and a controller 320 capable of controlling components of the brake device 310.

The brake device 310 may include the hydraulic pressure supplier 100, a motor position sensor 312, a motor current sensor 313, and the hydraulic controller 200.

The hydraulic pressure supplier 100 may receive the driver's intention of braking in an electric signal from a displacement of the brake pedal 10 and operate mechanically. It may also produce hydraulic pressure of oil using rotational force of the motor 120. This was described above in connection with FIG. 1, so the description thereof will not be repeated below.

The motor position sensor 312 may measure a position of the motor 120, and a rotation angle of the motor 120 in particular. The rotation angle of the motor 120 measured by the motor position sensor 312 may be used as the control basis for a controller 320, which will be described later.

Furthermore, the motor position sensor 312 may include a motor control sensor MPS as shown in FIGS. 1 and 2.

The motor current sensor 313 may measure a current of the motor 120. Specifically, the motor current sensor 313 may detect a current signal of the motor 120 to measure a direct current (dc current) or an alternate current (ac current) of the motor 120. The current of the motor 120 measured by the motor current sensor 313 may be used along with the rotation angle of the motor 120 as the control basis for the controller 320, which will be described later.

The hydraulic controller 200 may include the first and second hydraulic circuits 201 and 202 to convey the hydraulic pressure discharged from the hydraulic pressure supplier 100 to the wheel cylinder 40 installed on the at least one wheel, and the hydraulic circuits 201 and 202 may include the plurality of inlet valves 221 (221a, 221b, 221c, and 221d) to control the flow of hydraulic pressure.

For example, as described above in connection with FIG. 1, the first hydraulic circuit 201 may have two inlet valves 221a and 221b coupled to the first hydraulic flow path 211 for controlling hydraulic pressure conveyed to the two wheel cylinders 40, respectively, and the second hydraulic circuit 202 may have two inlet valves 221c and 221d coupled to the second hydraulic flow path 212 for controlling hydraulic pressure conveyed to the two wheel cylinders 40, respectively.

The inlet valve 221 may control the flow of hydraulic pressure discharged from the hydraulic pressure supplier 100 and the amount of flow conveyed to the wheel cylinder 40.

The hydraulic pressure may be controlled by opening or closing operation of the inlet valve 221, and may prevent leaks by being closed when there is a leak in the hydraulic circuit 314.

There may be at least one inlet valve 221, including the first and second inlet valves 221a and 221b. In this case, each of the first and second inlet valves may control the hydraulic pressure conveyed to a wheel cylinder provided on at least one wheel. This was described above, so the detailed description will not be repeated.

Although the hydraulic circuits 201 and 202 and the inlet valve 221 are shown as separate components in the hydraulic controller 200 in FIG. 3, the inlet valve 221 may be included in each of the hydraulic circuits 201 and 202.

The controller 320 may control various components of the brake device 310, and especially, control the inlet valve 221 to open or close the inlet valve 221.

The controller 320 may control the inlet valve 221 such that the inlet valve 221 is opened or closed based on whether there is a leak in the hydraulic controller 200.

For this, the controller 320 may determine whether there is a leak in the hydraulic controller 200. Specifically, the controller 320 may determine whether there is a leak in the hydraulic controller 200 based on a position of the motor 120 measured by the motor position sensor 312 and a current of the motor 120 measured by the motor current sensor 313.

The controller 320 may determine a stiffness coefficient k of the electric brake system 1 based on the motor rotation angle θ, which is a position of the motor 120, and a current of the motor 120.

The stiffness coefficient k may be defined as a ratio of motor torque to a rotation angle of the motor, which may be expressed in the following equation (1):

$$k = \tau/\theta \qquad (1)$$

where, k denotes the stiffness coefficient of the electric brake system 1, τ denotes motor torque, and θ denotes a rotation angle of the motor. The motor torque τ is proportional to motor current $i_q$, so the equation 1 may be substituted with the following equation (2):

$$k = C_k i_q/\theta \qquad (2)$$

where, k denotes the stiffness coefficient of the electric brake system 1, $C_k$ denotes a torque constant, and $i_q$ denotes a motor current.

The controller 320 may determine a stiffness coefficient k according to the equation (2), and based on comparison between the stiffness coefficient k and a preset value, whether there is a leak in the electric brake system 1 may be determined.

When there is no leak, motor torque τ' may be greater than a reference value τa, and rotation angle of motor θ' may be smaller than the reference value θa.

On the other hand, when there is a leak, motor torque τ" is smaller than the reference value τa and rotation angle of the motor θ" is greater than the reference value θa, which may lead to stiffness coefficient k2 for the occasion when there is a leak having a smaller value than the stiffness coefficient k1 for the occasion when there is no leak.

The controller 320 may determine whether there is a leak in the electric brake system 1 based on comparison between the determined stiffness coefficient k and a first threshold X1. The first threshold X1 refers to a reference stiffness coefficient value based on which to determine whether there is a leak in the electric brake system 1, and which may be set to a minimum value of stiffness coefficient for an occasion when there is no leak.

Accordingly, the controller 320 may determine whether there is a leak in the hydraulic controller 200 from the stiffness coefficient determined based on the position (rotation angle) of the motor and the motor current, thereby enabling accurate determination of whether there is a leak even when there is a change in caliper brake fluid consumption.

Furthermore, the controller 320 may determine a circuit that there is a leak based on the stiffness coefficient k.

Specifically, the controller 320 may determine the circuit that there is a leak based on the stiffness coefficient k determined while performing an operation of closing the inlet valve 221. For example, the controller 320 may first close one of the inlet valves 221 and determine the circuit that has a leak based on the stiffness coefficient determined in the state in which the valve is closed.

When it is determined that there is a leak, the controller 320 may close one of the inlet valves 221 included in the hydraulic circuits 201 and 202 to find a circuit that has a leak. In this regard, the controller 320 may select a valve to be closed from among the inlet valves 221 included in the hydraulic circuits 201 and 202 randomly or in a predetermined order.

The controller 320 may determine whether there is a leak in the hydraulic circuit that includes the closed inlet valve based on comparison between the stiffness coefficient k determined while the inlet valve is closed and a second threshold X2. The second threshold X2 may refer to a reference stiffness coefficient based on which to determine a circuit that has a leak. The second threshold X2 may be smaller than the first threshold X1.

When the stiffness coefficient is equal to or less than the second threshold X2 while a particular inlet valve is closed, i.e., the stiffness coefficient is reduced to the second threshold X2 or less even though the inlet valve is closed, the controller 320 may determine that there is no leak in the hydraulic circuit that includes the closed inlet valve. In this case, the controller 320 may determine that there is a leak in the other hydraulic circuit than the hydraulic circuit including the closed inlet valve.

On the other hand, when the stiffness coefficient is greater than the second threshold X2 while the particular inlet valve is closed, the controller 320 may determine that there is a leak in the hydraulic circuit that includes the closed inlet valve.

Furthermore, the controller 320 may determine a wheel that has a leak based on the stiffness coefficient k. Specifically, the controller 320 may determine the wheel that has a leak based on the stiffness coefficient k determined while performing an operation of closing the inlet valve 221. For example, the controller 320 may first close one of the inlet valves 221 and determine a wheel that has a leak based on the stiffness coefficient determined in the state in which the valve is closed.

Once a circuit is determined to have a leak, the controller 320 may first close one of the inlet valves 221 included in the circuit that has a leak, to find a wheel that has a leak. In this regard, the controller 320 may select an inlet valve to be closed from among the inlet valves 221 included in the circuit that has a leak, randomly or in a predetermined order.

The controller 320 may determine whether there is a leak in a wheel coupled to the closed inlet valve based on comparison between the stiffness coefficient k determined while the inlet valve is closed and a third threshold X3. The third threshold X3 refers to a preset system reference stiffness coefficient based on which to determine a wheel that has a leak, which may be smaller than the first threshold X1. Furthermore, the third threshold X3 may be smaller than the second threshold X2.

When the stiffness coefficient is greater than the third threshold X3 while the particular inlet valve is closed, the controller 320 may determine that there is no leak in the wheel coupled to the closed inlet valve. In this case, the controller 320 may close an inlet valve coupled to a wheel other than the wheel coupled to the closed inlet valve, and determine that the wheel whose inlet valve is closed later has a leak.

In this way, the controller 320 may determine whether there is a leak without using a pressure sensor signal, thereby enabling accurate determination of whether there is a leak even in a situation where there is a change in caliper brake fluid consumption. At the same time, since the determination on which circuit or wheel has a leak follows after an operation of closing the inlet valve, a quick response to the leak may be made. Accordingly, efficiency of leak control and driving stability may increase.

The controller 320 may perform a detailed leak control operation based on the determined circuit and/or wheel that has a leak.

Operation of the controller 320 of the electric brake system 1 according to an embodiment will now be described in detail in connection with FIGS. 4 and 6.

Figure 4:
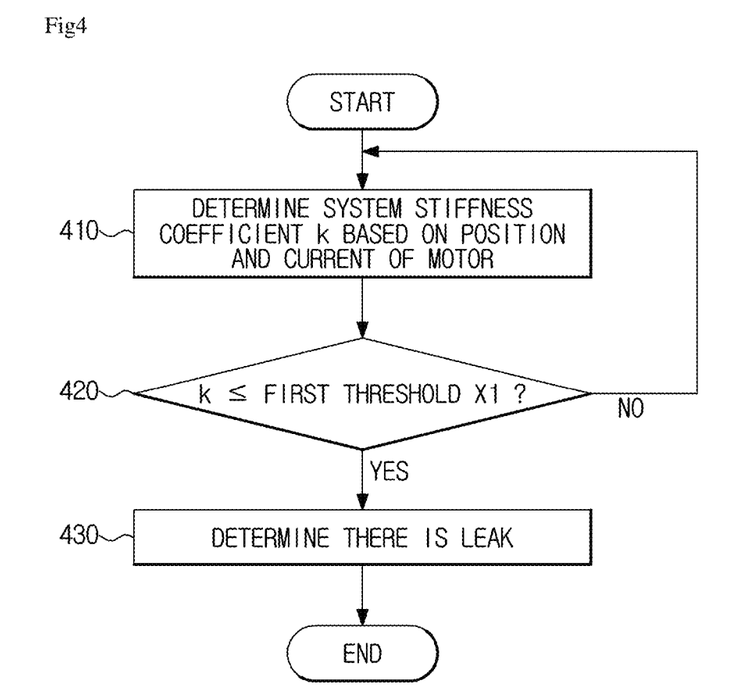
FIG. 4 is a flowchart illustrating a control method of an electric brake system, according to an embodiment.
Figure 5:
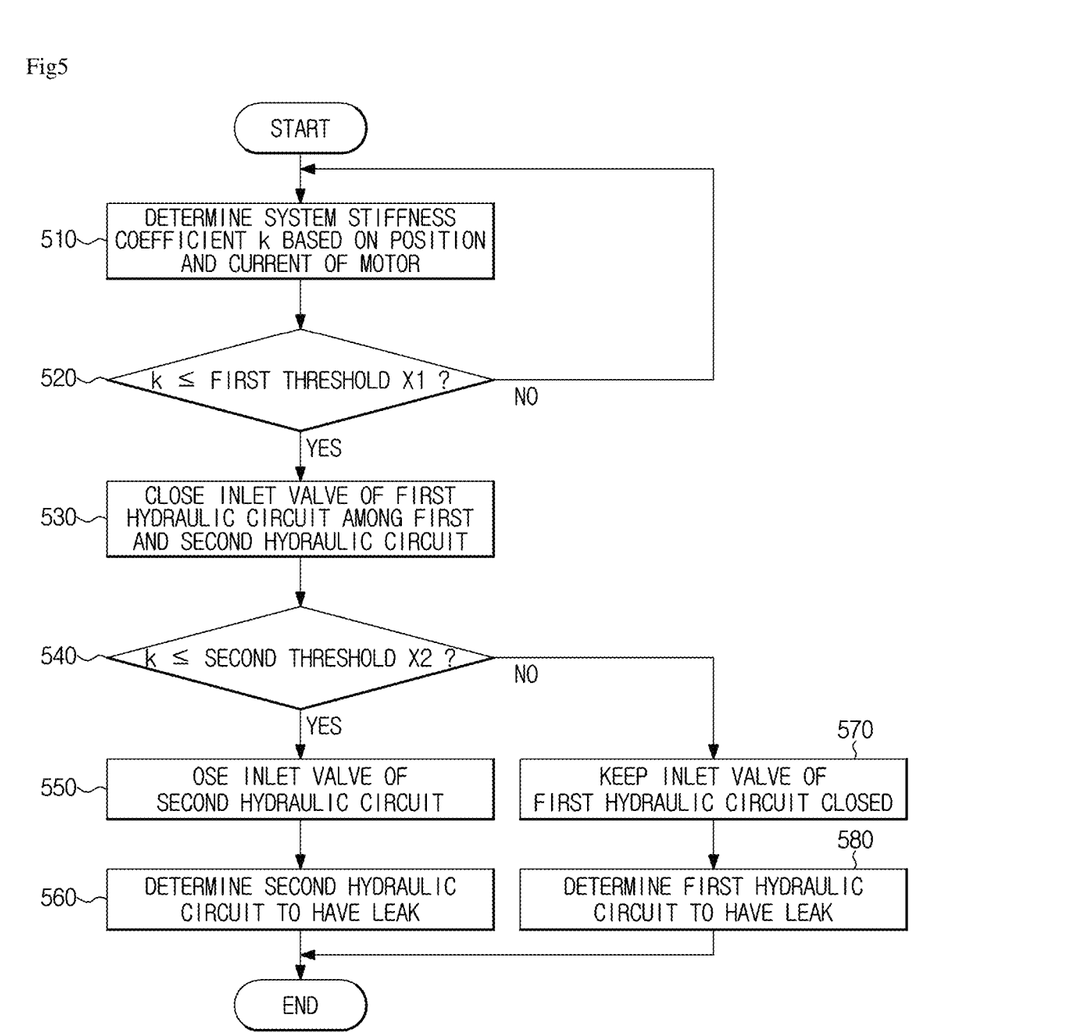
FIG. 5 is a flowchart illustrating a control method of an electric brake system, according to another embodiment.
Figure 6:
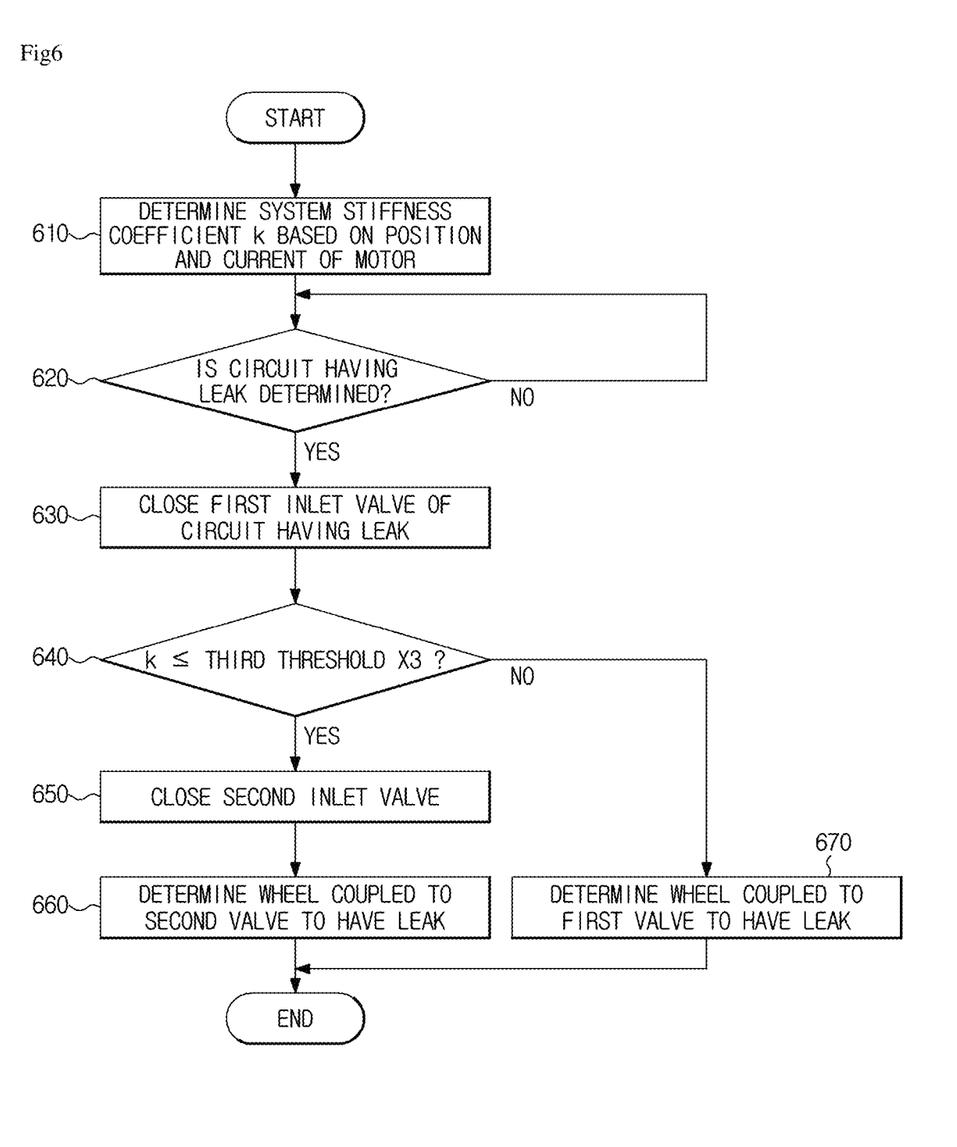
FIG. 6 is a flowchart illustrating a control method of an electric brake system, according to another embodiment.

FIGS. 4, 5, and 6 are flowcharts each illustrating a control method of an electric brake system according to an embodiment.

Referring to FIG. 4, the controller 320 determines a system stiffness coefficient k based on a motor position and a motor current, in 410. Specifically, the controller 320 may determine the stiffness coefficient k using the equation (2) based on a rotation angle and current of the motor 120.

Once the system stiffness coefficient k is determined, the controller 320 determines whether the determined stiffness coefficient k is equal to or less than the first threshold X1, in 420. The first threshold X1 refers to a preset value of stiffness coefficient based on which to determine whether there is a leak. The first threshold X1 may has a minimum value of stiffness coefficient for an occasion when there is no leak, but is not limited thereto and may be determined in advance to have a value for distinguishing between occasions when there is and is not a leak.

The controller 320 determines that there is a leak when the stiffness coefficient k is equal to or less than the first threshold X1, in 430. Once it is determined that there is a leak, the controller 320 may perform a leak control operation, which may include an operation of determining a circuit that has a leak, an operation of determining a wheel that has a leak, and an operation of controlling opening or closing of an inlet valve.

In this way, the controller 320 may determine whether there is a leak without using a pressure sensor signal, thereby enabling accurate determination on whether there is a leak even in a situation where there is a change in caliper brake fluid consumption.

Referring to FIG. 5, the controller 320 determines a system stiffness coefficient k based on a motor position and a motor current, in 510, and determines whether the system stiffness coefficient k is equal to or less than the first threshold X1, in 520. The first threshold X1 refers to a reference stiffness coefficient value based on which to determine whether there is a leak in the electric brake system 1, and which may be set to a maximum value of stiffness coefficient for an occasion when there is a leak.

The steps 510 and 520 may include the aforementioned steps 410 to 430 of FIG. 4.

When the system stiffness coefficient k is equal to or less than the first threshold X1, the controller 320 determines that there is a leak, and closes an inlet valve of the first hydraulic circuit 201 among the first and second hydraulic circuits 201 and 202, in 530.

When the first hydraulic circuit 201 includes the first and second inlet valves 221a and 221b, the controller 320 may close at least one of the first and second inlet valves 221a and 221b. After closing the inlet valve of the first hydraulic circuit 201, the controller 320 determines whether the system stiffness coefficient k is equal to or less than the second threshold X2, in 540. The second threshold X2 may refer to a reference stiffness coefficient based on which to determine a circuit that has a leak. The second threshold X2 may be smaller than the first threshold X1 of the step 530.

When the system stiffness coefficient k is equal to or less than the second threshold X2, the controller 320 may determine that there is no leak in the closed first hydraulic circuit 201. In this case, the controller 320 closes an inlet valve of the second hydraulic circuit 202, in 550.

When the second hydraulic circuit 202 includes the third and fourth inlet valves 221c and 221d, the controller 320 may close at least one of the third and fourth inlet valves 221c and 221d.

The controller 320 then determines the second hydraulic circuit 202 to have a leak, in 560. In another example, when the system stiffness coefficient k is not equal to or less than the second threshold X2, i.e., the system stiffness coefficient k is greater than the second threshold X2, the controller 320 maintains the state of the first hydraulic circuit 201, which is closed in 530.

The controller 320 keeps the inlet valve of the first hydraulic circuit 201 closed in 570, and determines the first hydraulic circuit 201 to have a leak in 580.

In this way, the controller 320 may determine the circuit that has a leak within a relatively short period of time, thereby enabling efficient leak control to be performed.

Referring to FIG. 6, the controller 320 determines a system stiffness coefficient k based on a motor position and a motor current in 610, and accordingly, a circuit that has a leak. The step 610 of FIG. 6 may be the same as the step 410 of FIG. 4 and the step 510 of FIG. 5, and may include the steps 420 and 430 of FIG. 4.

The controller 320 determines whether a circuit having a leak is determined, in 620. When the circuit having a leak is determined, the controller 320 closes a first valve among a plurality of valves that are included in the circuit having a leak, in 630. Specifically, the first valve may be an inlet valve, and the controller 320 closes one of a plurality inlet valves that are included in the hydraulic circuit determined to have a leak, in 630.

The controller 320 may determine the first valve among the plurality of valves that are included in the circuit determined to have a leak, randomly or in a predetermined order.

After closing the first valve, the controller 320 determines whether the system stiffness coefficient k exceeds the third threshold X3, in 640.

The system stiffness coefficient refers to a stiffness coefficient determined in a state where one of the inlet valves of the circuit that has a leak is closed. In other words, it is a stiffness coefficient determined while the first valve is closed.

Furthermore, the third threshold X3 refers to a preset system reference stiffness coefficient based on which to determine a wheel that has a leak, which may be smaller than the first threshold X1. Furthermore, the third threshold X3 may be smaller than the second threshold X2. When the system stiffness coefficient k exceeds the third threshold X3, the controller 320 closes a second valve, in 650. The second valve may be an inlet valve coupled to a wheel other than the wheel coupled to the first valve, among wheels coupled to the circuit that has a leak. At the same time, the controller 320 may open the first valve.

The controller 320 then determines a wheel coupled to the second valve to have a leak, in 660.

In another example, when the system stiffness coefficient k is equal to or less than the third threshold X3, the controller 320 determines the wheel coupled to the first valve to have a leak, in 670.

As described above, the controller 320 may determine a wheel that has a leak based on the stiffness coefficient determined while performing an operation of closing the inlet valve. This may enable the efficiency in leak control to be improved and simultaneously, secure stability of the vehicle.

According to embodiments of an electric brake system and control method thereof, leak control efficiency may increase and at the same time, vehicle stability may be secured more quickly.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An electric brake system comprising:
    a hydraulic pressure supplier configured to produce hydraulic pressure of oil using rotation force of a motor;
    a plurality of hydraulic circuits, each of the hydraulic circuits configured to convey hydraulic pressure discharged from the hydraulic pressure supplier to at least one wheel cylinder corresponding to each of the hydraulic circuits;
    a motor position sensor configured to measure a position of the motor;
    a motor current sensor configured to measure a current of the motor; and
    a controller configured to:
        determine a rotation angle of the motor based on the measured position,
        determine whether there is a leak in at least one of the hydraulic circuits based on a ratio of the rotation angle of the motor to the of the current of the motor, and
        determine which one of the plurality of hydraulic circuits has the leak based on the ratio of the rotation angle of the motor to the current of the motor.

2. The electric brake system of claim 1, wherein the controller is configured to determine a stiffness coefficient of the system based on the ratio of the rotation angle of the motor to the current of the motor, and determine that there is the leak in the at least one of the hydraulic circuits when the stiffness coefficient is equal to or less than a first threshold.

3. The electric brake system of claim 2, wherein the controller is configured to determine the stiffness coefficient of the system based on the rotation angle of the motor and torque of the motor.

4. The electric brake system of claim 2, wherein the hydraulic circuits comprise:
    a first hydraulic circuit configured to convey hydraulic pressure discharged from the hydraulic pressure supplier to a first wheel cylinder installed on at least one first wheel; and
    a second hydraulic circuit configured to convey hydraulic pressure discharged from the hydraulic pressure supplier to a second wheel cylinder installed on at least one second wheel,
    wherein the first hydraulic circuit comprises one or more first inlet valves configured to control the flow of hydraulic pressure discharged from the hydraulic pressure supplier, and
    wherein the second hydraulic circuit comprises one or more second inlet valves configured to control the flow of hydraulic pressure discharged from the hydraulic pressure supplier.

5. The electric brake system of claim 4, wherein the controller is configured to close the one or more first inlet valves of the first hydraulic circuit, when the stiffness coefficient is equal to or less than the first threshold.

6. The electric brake system of claim 5, wherein the controller is configured to determine whether the stiffness coefficient is equal to or less than a second threshold after closing the one or more first inlet valves of the first hydraulic circuit, and based on the determination, determine the first hydraulic circuit or the second hydraulic circuit to have the leak, wherein the second threshold is smaller than the first threshold.

7. The electric brake system of claim 6, wherein the controller is configured to determine that the first hydraulic circuit has the leak, when the stiffness coefficient is greater than the second threshold.

8. The electric brake system of claim 6, wherein the controller is configured to determine that the second hydraulic circuit has the leak when the stiffness coefficient is equal to or less than the second threshold, and close the one or more second inlet valves of the second hydraulic circuit.

9. The electric brake system of claim 6, wherein the controller is configured to close the one or more first inlet valves included in the first hydraulic circuit determined to have the leak, and determine which wheel has the leak based on whether the stiffness coefficient exceeds a third threshold.

10. The electric brake system of claim 9, wherein the controller is configured to determine that a wheel coupled to the one or more second inlet valves has the leak when the stiffness coefficient exceeds the third threshold, and close the one or more second inlet valves.

11. The electric brake system of claim 9, wherein the controller is configured to determine that a wheel coupled to the one or more first inlet valves has the leak when the stiffness coefficient is equal to or less than the third threshold.

12. The electric brake system of claim 1, wherein the controller is configured to:
    calculate a stiffness coefficient of the system based on the ratio of the rotation angle of the motor to the current of the motor,
    determine whether there is the leak in the at least one of the hydraulic circuits when the stiffness coefficient is equal to or less than a first threshold, and in response to determination that there is the leak in the at least one of the hydraulic circuits, perform a leak control comprising at least one of an operation determining which hydraulic circuit among the plurality of hydraulic circuits has the leak based on the ratio of the rotation angle of the motor to the current of the motor, an operation determining which wheel among a plurality of wheels has the leak based on the ratio of the rotation angle of motor to the current of the motor, and an operation controlling opening or closing one or more inlet valves included in We hydraulic circuits.

13. A control method of an electric brake system, the control method comprising:
measuring a position of a motor of a hydraulic pressure supplier;
determining a rotation angle of the motor based on the measured position;
measuring a current of the motor;
determining whether there is a leak in at least one of a plurality of hydraulic circuits, each of the hydraulic circuits configured to covey hydraulic pressure discharged from the hydraulic pressure supplier to one or more wheel cylinders, corresponding to the current circuits, based on a ratio of the rotation angle of the motor to the current of the motor; and
determine which one of the plurality of hydraulic circuits has the leak based on the ratio of the rotation angle of the motor to the current of the motor when it is determined to have the leak in the at least one of the plurality of hydraulic circuits.

14. The control method of claim 13, wherein the determining of whether there is the leak comprises
determining a stiffness coefficient of the system based on the ratio of the rotation angle of the motor to the current of the motor, and determining that there is the leak when the stiffness coefficient is equal to or less than a first threshold.

15. The control method of claim 14, further comprising:
closing one or more first inlet valves of a first hydraulic circuit included in the plurality of hydraulic circuits, when the stiffness coefficient is equal to or less than the first threshold.

16. The control method of claim 15, wherein the determining of which one of the hydraulic circuits has the leak comprises
determining whether the stiffness coefficient is equal to or less than a second threshold after closing the one or more first inlet valves of the first hydraulic circuit, and based on the determination of whether the stiffness coefficient is equal to or less than the second threshold, determining one of the first hydraulic circuit and a second hydraulic circuit, included in the plurality of hydraulic circuits, to have the leak.

17. The control method of claim 16, wherein the determining of one of the first hydraulic circuit and the second hydraulic circuit to have the leak comprises
determining that the first hydraulic circuit has the leak when the stiffness coefficient is greater than the second threshold.

18. The control method of claim 16, wherein the determining of one of the first hydraulic circuit and the second hydraulic circuit to have the leak comprises
closing the one or more second inlet valves of the second hydraulic circuit when the stiffness coefficient is equal to or less than the second threshold, and determining that the second hydraulic circuit has the leak.

19. The control method of claim 16, further comprising:
closing the one or more first inlet valves included in the first hydraulic circuit determined to have the leak, and determining which wheel has the leak based on whether the stiffness coefficient exceeds a third threshold.

20. The control method of claim 19, wherein the determining of a wheel that has the leak comprises
closing the one or more second inlet valves included in the second hydraulic circuit determined to have the leak when the stiffness coefficient exceeds the third threshold, and determining which wheel coupled to the one or more second inlet valves has the leak, and
determining which wheel coupled to the one or more first inlet valves has the leak when the stiffness coefficient is equal to or less than the third threshold.

* * * * *